Patented Sept. 20, 1927.

1,643,276

UNITED STATES PATENT OFFICE.

WILLIAM BURNS LOGAN, OF DE QUINCY, LOUISIANA, ASSIGNOR TO ACME PRODUCTS COMPANY, INC., OF NEW ORLEANS, LOUISIANA, A CORPORATION OF LOUISIANA.

PURIFIED ROSIN AND PROCESS OF PRODUCING THE SAME.

No Drawing.   Application filed April 21, 1926.   Serial No. 103,652.

The present invention relates to the treatment of rosin and while applicable to ordinary rosin (colophony) is especially important in the case of "wood rosin" whereby to substantially improve certain of its qualities as more particularly described below.

At the outset it may be stated that there are two well known kinds of rosin which differ from each other fundamentally, although chemically they are both composed to a large extent at least of abietic acid, or its anhydrids.

Gum rosin has for years been the standard material and this commands a higher price than wood rosin. Gum rosin is made by tapping the living pine trees and distilling the oleoresin which exudes, this distilling being conducted with steam at comparatively low temperatures, and being carried on for a relatively short time only. Spirits of turpentine pass over with the steam, the vapors being condensed and the spirits of turpentine collected. The rosin is the material left in the distilling vessel. Rosin produced in this manner is largely amorphous and difficultly crystallizable. This amorphous character is of great value in connection with certain uses to which rosin is put, for example when the rosin is to be dissolved in petroleum oils or fatty oils for use as a core binder, or, as a component of printing ink. Although it is possible to effect a crystallization or partial crystallization of gum rosin under certain conditions, the crystals produced are in the form of plates, and not needles. There are other distinctions between gum rosin and wood rosin which will be apparent to those familiar with the materials, some of the said differences being referred to below.

Wood rosin is a material obtained by extraction from dead timber, waste wood, stumps and the like, constituting a by-product in lumbering operations. The extraction is usually performed with volatile solvents. The wood is generally chopped up or hogged to some extent, before such extraction operation. In the recovery of the solvent, and in sufficiently expelling the solvent from the rosin, the material is usually subjected to a long continued steaming, say about 10 hours in many cases, at relatively high temperatures, running up to about 150 to 157° C., in many cases and, probably due to the treatment, the abietic acid undergoes an internal molecular change during such process, indicated by an inversion of the optical activity. The wood rosin unlike the gum rosin, shows a great tendency to crystallize, and the crystal form is changed from that of plates to that of needles. The tendency of the wood rosin to crystallize makes it unsuitable for certain uses, particularly those uses in which it is dissolved in petroleum oils or fatty oils, due to the fact that from such solutions a large part of the rosin may crystallize out. It also crystallizes when cooled from the melted state, to a considerable extent.

A further objection to wood rosin is that it contains more or less dark matter which is substantially insoluble in the common solvents for rosin, and is commonly referred to in the trade as "nigre". This material, when the rosin is acted upon by solvents is converted into a more or less gummy mass which is difficult, (and in fact practically impossible) to separate from the solution, but causes trouble when the solution is employed.

In accordance with the present invention, rosin, and more particularly the wood rosin is subjected to a high heating operation, for a sufficient time to produce the change desired. The temperature necessary during this heating operation seems to be about 260° C. as a minimum, which temperature would have to be continued for a rather long time, say about 8 hours, to partially rid the product of the crystallization tendency. If a somewhat higher temperature is used, say 300° C., this may be continued for about two hours, and a far better product produced. When the wood rosin is heated to 300° C., for two hours, or when heated to a higher temperature for a shorter period, the "nigre" is converted into a soluble state. If only heated to somewhat below 300° C., say even up to 280° C., and even for a longer period the "nigre" does not become wholly soluble. All of the temperatures stated herein, (say 260 to 325° C., for the lengths of time specified) are capable of improving the wood rosin as to crystallizing properties and optical rotation. The temperature may even be carried up somewhat higher, say to 325° C., at which temperature the change will be sufficiently effected in about 10 minutes. With some kinds of wood rosin the temperature may be carried a little higher than 325°

C., but generally it is more advisable to not carry the temperature substantially above 300° C., and to maintain this temperature for about two hours, thereby producing the desired conversion, without overheating the mass to cause undesired side reaction. At the end of the heating operation, the rosin is cooled, preferably rather rapidly, to about room temperature. It will be found that the rosin will readily dissolve in the solvents above referred to, practically all of the "nigre" of the rosin going into solution. The heating treatment has also altered the color of the rosin a little, but the change in color is not of substantial importance. The wood rosin after the heat treatment does not show a tendency to crystallize to any considerable extent, and its optical rotation has been changed. The alteration in optical rotation appears to be in direct proportion to the lowering of the tendency to crystallize.

The optical rotation of the different kinds of rosin is given as follows, these referring to "specific rotation" figures, in petroleum solvents. Ordinary gum rosin has a specific rotation of about +7 to +20, and the average grades run around +15. Wood rosin varies (in specific rotation power) from about +1½ up to +7, the average being about +4. The treated wood rosin will of course vary more or less, but I find it most advisable to continue the heating until the rotation figure amounts to about +25 to +32.

One of the important uses of rosin is in the manufacture of rosin sizes. These sizes are used for sizing paper and numerous other uses, and heretofore what has been referred to as "high free rosin size" containing over 15% of rosin, could not well be made from wood rosin, but had to be made from gum rosin. The wood rosin treated in accordance with the present process is found to be highly suitable for the manufacture of rosin sizes of this character.

As above stated gum rosin can also be treated in accordance with the present process, and the temperatures and times above stated are in general also suitable for the treatment of gum rosin of ordinary quality. The treatment of the gum rosin may be such as to alter its optical rotation up to about +25 or more. The gum rosin so treated is found to be superior to ordinary gum rosin for the uses as above referred to.

While I have referred to treating wood rosin in order to improve some of its properties and make the same more like gum rosin, it will be understood that the treated wood rosin is still substantially different from gum rosin, and actually possesses many of the characteristic properties of wood rosin, so that I do not claim that the treated wood rosin can be used as a substitute for gum rosin for all of its uses. It will be understood that in the treatment of gum rosin in accordance with the present invention, as described above, this does not thereby become converted into a wood rosin, but many of the characteristic properties of gum rosin, by which this is distinguished from wood rosin, still remain.

Rosin, as is well known, is readily soluble in petroleum oils, drying and non-drying fatty oils (vegetable oils), alcohol, and these, as well as mixtures thereof, are commonly used as rosin solvents. The nigre of ordinary (i. e. untreated) wood rosin, is not readily soluble in these, at ordinary temperature.

In the present case, the wood rosin is subjected to the heat treatment "substantially by itself", that is to say I do not need to add any other materials to the wood rosin to be treated. I treat the wood rosin after separation from the wood, and do not make any claim to subjecting the wood containing the wood rosin, to any heating operation. I am aware that in the separation of the wood rosin from the wood, the wood containing the wood rosin, is heated.

I claim:—

1. A process of improving wood rosin which comprises heating such rosin substantially by itself to a temperature between approximately 260 and 325° C., until its positive optical rotation has been increased to substantially above +7.

2. A process of improving wood rosin which comprises heating such rosin substantially by itself at about atmospheric pressure to a temperature of about 300° C., until its positive optical rotation has been increased to substantially above +4, such operation requiring not considerably over two hours.

3. Wood rosin having a positive optical rotation at least +15.

4. Wood rosin in which the "nigre" content is soluble in rosin solvents.

5. Wood rosin having substantially no greater tendency to crystallize than that possessed by ordinary grades of gum rosin.

6. In the treatment of wood rosin, to render the same more suitable as a substitute for gum rosin, the herein described process which comprises heating the same to a temperature between approximately 300 and 325° C., until the "nigre" contained therein is rendered soluble in the solvents of rosin.

7. Wood rosin having an optical rotation equal to about +25 to +32.

8. Wood rosin having approximately the same solubility, crystallizing properties and optical activity, as are produced in wood rosin by heating the same to 300° C., for about two hours.

WM. BURNS LOGAN.